(12) United States Patent
Keras

(10) Patent No.: US 8,475,723 B2
(45) Date of Patent: Jul. 2, 2013

(54) DIELECTRIC BARRIER DISCHARGE CELL WITH HERMETICALLY SEALED ELECTRODES AND AUTOMATIC WASHING OF ELECTRODES DURING OPERATION OF THE CELL

(75) Inventor: Allan D. Keras, Abbotsford (CA)

(73) Assignee: IONO2X Engineering, L.L.C., Woodland, WA (US)

( * ) Notice: Subject to any disclaimer, the term of this patent is extended or adjusted under 35 U.S.C. 154(b) by 171 days.

(21) Appl. No.: 12/849,694

(22) Filed: Aug. 3, 2010

(65) Prior Publication Data

US 2011/0189057 A1 Aug. 4, 2011

Related U.S. Application Data

(63) Continuation-in-part of application No. 11/345,633, filed on Jan. 31, 2006, now Pat. No. 7,767,167, which is a continuation-in-part of application No. 10/628,686, filed on Jul. 28, 2003, now Pat. No. 6,991,768.

(51) Int. Cl.
*B01J 19/08* (2006.01)
*B01D 53/32* (2006.01)

(52) U.S. Cl.
USPC .................................. 422/186.04; 422/121

(58) Field of Classification Search
USPC .......................................... 422/186.04, 121
See application file for complete search history.

(56) References Cited

U.S. PATENT DOCUMENTS

| | | | |
|---|---|---|---|
| 2,136,572 A | 11/1938 | Winkelmann et al. | |
| 3,798,457 A | 3/1974 | Lowther | |
| 3,801,791 A | 4/1974 | Schaefer | |
| 4,992,246 A | 2/1991 | Serizawa et al. | |
| 5,091,069 A | 2/1992 | Hendrickson et al. | |
| 5,549,874 A * | 8/1996 | Kamiya et al. | 422/186.04 |
| 5,843,288 A | 12/1998 | Yamamoto | |

(Continued)

FOREIGN PATENT DOCUMENTS

| JP | 09-141133 | 6/1997 |
|---|---|---|
| JP | 10-192734 | 7/1998 |

(Continued)

OTHER PUBLICATIONS

Heise et al.; Sterilization of Polymer Foils with Dielectric Barrier Discharges at Atmospheric Pressure, Plasma and Polymers; Mar. 5, 2004; vol. 9, No. 1; pp. 23-33.

(Continued)

*Primary Examiner* — Kishor Mayekar
(74) *Attorney, Agent, or Firm* — Thorpe North & Western LLP

(57) ABSTRACT

A Dielectric Barrier Discharge Plasma Generation Cell (DB-DPGC) includes a plurality of hot electrodes interspersed with a plurality of ground electrodes whereby a power supply connected between the hot and ground electrodes creates a non-thermal plasma between the electrodes. The hot electrodes are hermetically sealed. A cleaning solution is applied to the electrodes to wash gas stream contaminants and/or reaction by products off the electrodes at times during operation of the cell when desired to clean the electrodes to maintain cell efficiency. A catalyst solution can be applied to the electrodes after cleaning. Where a plurality of cells are electrically connected in parallel, shorts in a cell can be detected by sensing the difference in currents feed to each of the plurality of cells.

17 Claims, 8 Drawing Sheets

U.S. PATENT DOCUMENTS

Figure 1:
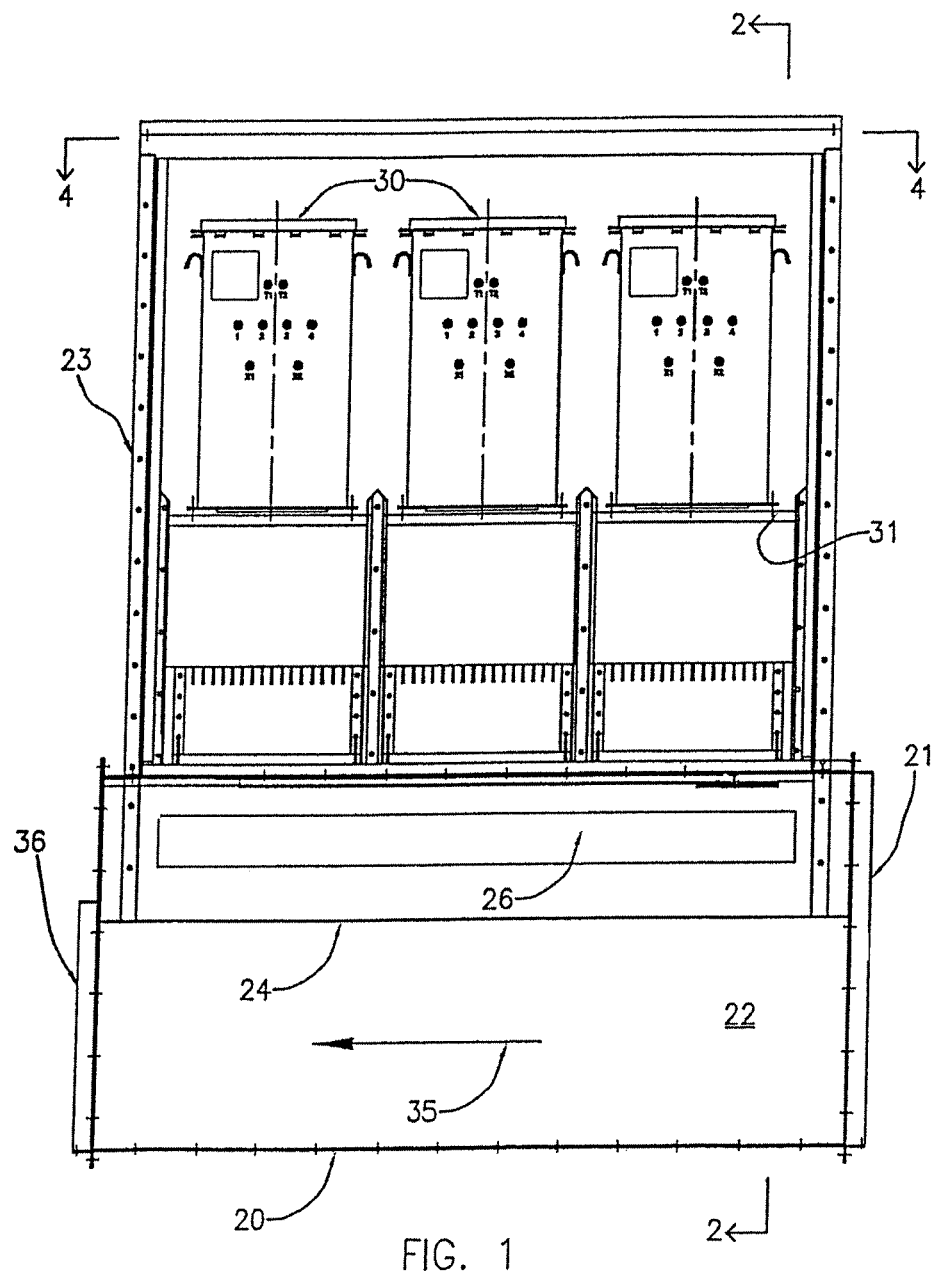

| | | | |
|---|---|---|---|
| 5,855,855 | A | 1/1999 | Williamson et al. |
| 5,871,703 | A | 2/1999 | Alix et al. |
| 5,904,905 | A | 5/1999 | Dolezal et al. |
| 6,030,506 | A | 2/2000 | Bittenson et al. |
| 6,146,599 | A | 11/2000 | Ruan et al. |
| 6,432,280 | B1 | 8/2002 | Bianco et al. |
| 6,451,252 | B1 | 9/2002 | Ruan et al. |
| 6,483,694 | B1 | 11/2002 | Monden et al. |
| 6,912,841 | B2 * | 7/2005 | Pfendtner et al. ............... 60/275 |
| 6,991,768 | B2 | 1/2006 | Keras et al. |
| 7,318,857 | B2 | 1/2008 | Ray et al. |
| 2002/0028163 | A1 | 3/2002 | Nelson et al. |
| 2002/0153241 | A1 | 10/2002 | Niv et al. |
| 2003/0030374 | A1 | 2/2003 | Pai |
| 2005/0023128 | A1 | 2/2005 | Keras et al. |
| 2006/0251550 | A1 | 11/2006 | Keras |
| 2006/0257299 | A1 | 11/2006 | Lanz |

FOREIGN PATENT DOCUMENTS

| | | | |
|---|---|---|---|
| JP | 11-060210 | * | 3/1999 |
| JP | 2000-189846 | | 7/2000 |
| JP | 2005-095742 | * | 4/2005 |
| JP | 2008-208405 | | 9/2008 |
| WO | WO 03/027452 | * | 4/2003 |
| WO | WO2007089887 | | 8/2007 |

OTHER PUBLICATIONS

Laroussi et al.; Plasma Interaction With Microbes; Apr. 30, 2003; New Journal of Physics; vol. 5; 10 pages; 41.1-41.10; http://www.Njp.org.

Roth; Mechanisms of Sterilization, Decontamination, and Surface Energy Enhancement by Exposure to the One Atmosphere Uniform Glow Discharge Plasma (OAUGDP), Plasma Sciences Laboratory; http://plasma.ece.utk.edu, 6 pages.

Durme et al.; Combing Non-Thermal Plasma with Heterogeneous Catalysis in Waste Gas Treatment: A Review; 2008; Applied Catalysis B: Environmental vol. 78; pp. 324-333.

PCT Application PCT/US07/02725; filed Jan. 31, 2007; Allan D. Keras; ISR mailed Sep. 24, 2007.

PCT Application PCT/US2011/046470; filed Aug. 3, 2011; Allan D. Keras; International Search Report mailed May 1, 2012.

* cited by examiner

DIELECTRIC BARRIER DISCHARGE CELL WITH HERMETICALLY SEALED ELECTRODES AND AUTOMATIC WASHING OF ELECTRODES DURING OPERATION OF THE CELL

RELATED APPLICATIONS

This is a Continuation-in-Part of application Ser. No. 11/345,633, filed Jan. 31, 2006, entitled "Dielectric Barrier Discharge Cell with Hermetically Sealed Electrodes, Apparatus and Method for the Treatment of Odor and Volatile Organic Compound Contaminants in Air Emissions, and for Purifying Gases and Sterilizing Surfaces", now U.S. Pat. No. 7,767,167, which was a Continuation-in-Part of application Ser. No. 10/628,686, filed Jul. 28, 2003, entitled "Apparatus And Method For The Treatment Of Odor And Volatile Organic Compound Contaminants In Air Emissions", now U.S. Pat. No. 6,991,768.

BACKGROUND OF THE INVENTION

1. Field

The invention is in the field of non-thermal plasma (NTP) generation cells and treatment systems such as used for treating emission gases from commercial and industrial processing wherein the gases used for such activity contain odors and/or volatile organic compound contaminants and/or hydrocarbon compounds, some of which are considered to be pollutants, and need to be removed from the gas before release of the gas to the atmosphere, and in purification of gases and in sterilization of surfaces.

2. State of the Art

Odorous compounds, which could be organic or inorganic, herein called odors, and/or volatile organic compound (VOC) contaminants and/or hydrocarbon compounds herein called VOCs, emitted into the environment from a range of sources and processes can fill the air in and about residential neighborhoods. Such odors and/or VOCs can range from mildly offensive to intolerable levels. This is a common problem in areas that are in proximity to such sources. Examples of odorous sources include industries that process organic materials such as those that process and produce food for human consumption and industries that produce animal feed for the pet, fish, poultry and hog industry, and general agricultural applications. Other industries that process organic materials and release odors are those that process animal products including meat processing and rendering plants. Other organic odor sources include composting facilities, sewage treatment centers, garbage transfer stations and other industrial organic processing facilities. Generally, these industrial operations exhaust gases from cooking, grinding, drying, cooling, manufacturing, or reduction processes. These exhausts contain low-level concentrations of amines, aldehydes, fatty acids, and volatile organic compounds (VOCs) inherent in the materials processed and those are driven into the exhausted gas stream by the processing activity. These industries typically have large gas flow volumes, ranging from 1,000 to 250,000 actual cubic feet of gas per minute (ACFM) and above.

Agricultural activities that raise animals for food production, such as hog, poultry and dairy farms also emit strong and offensive odors into the environment from manure and barn ventilation odors and these can release offensive odors in sufficient quantity to fill many square kilometers under certain weather conditions.

Additional sources of environmental emissions exist that expel VOCs from non-organic processing, such as solvent evaporation from painting, cleaning, and other general industrial and commercial activities. Some VOCs may have little or no odor, but are considered atmospheric pollutants and/or carcinogens and need treatment to reduce them to harmless compounds. In the case where odors and VOCs are very potent, even concentrations in the parts per billion ranges can be offensive or exceed environmental emission limits and these also need treatment.

There are various systems designed to oxidize and/or reduce odorous and VOC emissions in commercial and/or industrial process gas that is to be emitted into the environment so that the emitted exhaust gas stream is within environmental regulatory limits. Some of these systems use non-thermal plasma (NTP) which is formed in dielectric barrier discharge (DBD) cells to create a wide range of activated species such as activated or Reactive Oxygen Species (ROS) that are then mixed with the gas to be treated so that the organic compounds that humans normally detect as odor, and/or VOCs, are oxidized and/or reduced, typically to carbon dioxide and water vapor, though other products are possible depending on the chemical characteristics of the pollutants, by the energetic ions in the ROS.

Activated species, as described herein, are chemical entities that are created in useful concentrations by the application of sufficient energy, such as through dielectric barrier discharge, to drive the molecules of interest from the ground state into the active state required, with the ground state being the normal state of these molecules typically at a nominal one-atmosphere pressure and 20 degrees C. (or whatever atmospheric and temperature conditions occur at the place of the odor, VOC, and/or organic compound emissions). Activated species are typically designated in literature by "." as in O. for active oxygen (atomic oxygen in this case). Activation occurs through a number of mechanisms including direct electron collisions or secondary collisions, light absorption, molecular processes involving ionization, or internal excitation.

Dielectric Barrier Discharge (DBD) technology has been used to create the non-thermal plasma (NTP) that generates the activated species required for the purposes of this invention, and as such technology inherently limits the eV that can be applied to the gasses passing through the barrier, it is mainly the Reactive Oxygen Species (ROS) which include a range of hydroxyl radicals, that are involved in this case, though other electron activity assists in the process. For the activated species generated in the NTP field, those ROS species that have the highest reduction potential (between about 2.4 and 5.2 eV) have the shortest availability with half-life concentrations of less than about 100 milliseconds. These react with the odorous molecules that need high reduction potential oxidizers for decomposition. These high reduction potential radicals, and the reactions between these particles and the odorous molecules reacting with them, occur only in the NTP field, as these radicals quickly decay to less active species outside the NTP field. These radicals react with the odorous molecules by oxidation and reduction transformations so that the odorous molecules are transformed to simpler molecular forms that are no longer detectable as odor. Additional activity occurring within the NTP is that of electron collisions, bombardment and direct ionization, which acts on all molecules within the field, including the compounds of concern. This electron action, as well as creating the ROS of interest, also results in the disruption of the molecular bonds of the odor and/or VOC compounds, which also aids in the ROS activity of oxidation and/or reduction of the odor and/or VOC compounds. The NTP field also creates, within the ROS, a range of lower reduction potential radicals (between about 1.4 and 2.4 eV), and these are longer lived with half-lives from about 100 milliseconds to several minutes. These radicals react with the odorous molecules that respond to this level of reduction potential and oxidation for decomposition. These reactions occur both in the NTP field and in the air stream outside the NTP field, as those radicals are active longer and are carried outside the NTP field by the airflow through the DBD. These longer-lived radicals also effect their changes on the odorous and/or VOC compounds by oxidation and reduction transformations, so that the compounds of concern are transformed to simpler molecular forms that are no longer detectable as odor. Such transformations also ultimately convert the complex organic molecules and hydrocarbon molecules into the most simplified oxides, such as carbon dioxide, hydrogen dioxide (water), nitrogen (N2) and other simplified oxide forms of the elements that were in the original complex compounds.

Four oxidation states of molecular dioxygen are known: $[O_2]^n$, where n=0, +1, −1, and −2, respectively, for dioxygen, dioxygen cation, superoxide anion, and peroxide dianion (symbolically expressed as $^3O_2$, $^3O_2\cdot^+$, $^3O_2\cdot^-$, and $^3O_2^{-2}$). In addition, $^3O_2$, is in a "ground" (not energetically excited) state. It is a free "diradical" having two unpaired electrons. The two outermost pair of electrons in oxygen have parallel spins indicating the "triplet" state (the preceding superscript "3", is usually omitted for simplicity). Oxygen itself is a common terminal electron acceptor in biochemical processes. It is not particularly reactive, and by itself does not cause much oxidative damage to biological systems. It is a precursor, however, to other oxygen species that can be toxic, including: superoxide anion radical, hydroxyl radical, peroxy radical, alkoxy radical, and hydrogen peroxide. Other highly reactive molecules include singlet oxygen, $^1O$, and ozone, $O_3$.

Ordinary oxygen does not react well with most molecules, but it can be "activated" by the addition of energy (naturally or artificially derived; electrical, thermal, photochemical or nuclear), and transformed into reactive oxygen species (ROS). Transformation of oxygen into a reactive state from the addition of a single electron is called reduction (Eqn. 1). The donor molecule that gave up the electron is oxidized. The result of this monovalent reduction of triplet oxygen is superoxide, $O_2\cdot^-$. It is both a radical (., dot sign) and an anion (charge of −1). Other reactive oxygen species known to be created with NTP, are noted below: (On the Ionization of Air for Removal of Noxious Effluvia [Air Ionization of Indoor Environments for Control of Volatile and Particulate Contaminants with Nonthermal Plasmas Generated by Dielectric-Barrier Discharge] Dr. Stacy L. Daniels, IEEE Transactions on Plasma Science, Vol. 30, No. 4, August 2002):

   (Eqn 1)

   (Eqn 2)

   (Eqn 3)

   (Eqn 4)

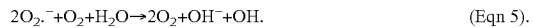   (Eqn 5)

For any given reactive oxygen species (ROS), there exists some confirmed or postulated reaction scheme for inter conversion to any of the other species. In any event, several of the above reactive oxygen species may be generated in the NTP and react with odorous molecules to transform them into simpler molecules that are no longer detected as odorous.

It has also been found that non-thermal plasmas from NTP generation cells can be used to purify gases and sterilize surfaces. The NTP and ROS will destroy airborne and surface microbes such as bacteria, molds, yeasts, and viruses. Gases passing through the NTP generation cells are purified and items to be sterilized can be placed in the NTP generations cells or the gases from the NTP generation cells can be circulated around the items to be sterilized to sterilize the items. For example, a gas such as air, nitrogen, or argon can be circulated and recirculated through the NTP generation cell and circulated and recirculated around an item to be sterilized.

Commercial and industrial volumes of contaminated gases to be treated normally have contaminants such as condensing water or other vapors and liquids, particles of some kind, or mixtures of both condensing fluids and particles. A problem arising from the use of dielectric bather discharge (DBD) cells, generating the NTP for treating industrial scale flows of contaminated gases, is that after a period of use, sometimes only a matter of minutes, the contaminants inherent in these gases build up in the cells and cause electrical short circuits in the cells from hot electrodes, across the insulation and support frames, to the ground electrodes. Of course, this interferes with the designed electrical properties of the DBD cell and immediately destroys any ability for the DBD cell to generate the NTP. In this case, it is very likely DBD cell component damage has occurred as electrical arcs have very high temperatures and parts are usually damaged that have been in contact with the arc, and at the very least, cleaning of the DBD cell is necessary to restore the electrical dielectric integrity of the DBD cell, and damaged parts must be replaced.

Parent application Ser. No. 10/628,686, now U.S. Pat. No. 6,991,768, and Ser. No. 11/345,033, now U.S. Pat. No. 7,767, 167, disclose hermetically sealing at least the positive or hot electrodes of a DBD NTP generation cell to reduce the short outs and damage to the electrodes in the cell and prolong the effective life of such cells. While the hermetic sealing of at least the portions of at least the hot electrodes in the cell where the contaminated gases to be treated pass over or along such electrodes disclosed in these referenced applications and patents are generally effective in preventing shorts due to build up of contaminants in the cells causing shorting between the electrodes, and is thus generally effective in extending the life of the electrodes and the NTP generating cells and extending the operation time of the cells, it has been found that still, when DBD electrodes are operating, air stream contaminants and plasma field induced chemical reaction by-product compounds can and do adhere to the surface the high voltage and ground electrodes. As deposits on the electrodes accumulate, the glow discharge (millions of random tiny micro discharges) gradually changes to a much smaller number of concentrated, stationary point discharges. During prolonged system operation the glow discharge gradually changes to a much smaller number of point discharges. When this occurs, the volume of desirable plasma induced chemical reactions decreases by about 50% or more, dramatically reducing the destruction efficiency of the targeted Volatile Organic Compounds (VOC) compounds that the system is designed to oxidize.

Depending upon the concentration and the unique mixture of chemical compounds in the contaminated air stream being treated by the NTP system, DBD cell electrode cleaning can be required after about 200 to 500 hours of operation. While this is a great improvement over cells where electrodes are not hermetically sealed, the required manual cleaning of the electrodes is still a time consuming and labor intensive process.

Further, it requires significant system down time. This is of particular importance because in many cases NTP systems are used to treat exhaust gases from processes that operate continuously, with high costs associated with stopping plant operation.

Additionally, over the last five to eight years many academic researchers have published papers on the use of "in-plasma" catalysts. This work has demonstrated that combining photocatalysts with non-thermal plasma can increase VOC destruction, alter the type and concentration of NTP by-products and reduce the energy required to achieve target VOC destruction levels. In many instances, destruction efficiencies are improved by 20 to 50+% by adding in-plasma catalysts. Unfortunately, it has been found that in full scale industrial applications of NTP systems, in-plasma catalytic material surfaces become coated by NTP break down products. In relatively short periods of time catalytic activity is significantly or totally impaired. In the case of titanium dioxide as an in-plasma catalyst, the electrodes must be cleaned and the nano-particle titanium dioxide coating must be re-applied frequently. However, again, if this work is completed manually, significant labor and system downtime costs are incurred.

Room still exists for improving the efficiency of NTP generating cells.

SUMMARY OF THE INVENTION

According to the invention, an automatic electrode washing system is provided for cleaning the electrodes of a dielectric barrier discharge (DBD) cell which generates the NTP for treating industrial scale flows of contaminated gases. This automatic washing of the electrodes takes place during operation of the cells so that shut down of the system, with associated shut down and down time of the plant, is not necessary. Further, the extensive labor normally require for manual cleaning is avoided. The automatic washing of the electrodes may take place on a periodic or continuous basis. Further, the automatic system may also be configured to apply catalyst to the electrodes after washing. Systems using hermetically sealed electrodes, such as described in the referenced applications and patents issued thereon, are particularly suited for automatic washing and catalyst application because the electrodes do not short when contaminated with water and chemical containing liquids because of the hermetic sealing of at least the high voltage electrodes. Further, cells having vertical orientations of the electrodes, which can easily be provided with cells having hermetically sealed electrodes, work well for such automated systems. Vertically arranged electrodes allow liquids, i.e., cleaning and/or catalyst solutions, to flow downwardly on the electrode surfaces under the force of gravity, preventing pooling of the liquids in the electrode gaps. In addition, if gas flow through the cell is also vertical downwardly along the electrodes, the gas flow will also assist the downward flow of liquids.

In the illustrated embody of the invention, one or more spray bars are positioned over or along the top of the electrodes making up the DBD cells. The spray bar moves in a forward and reverse path over the length of the electrodes in such a way that only a small section of the electrodes are sprayed at any one time. The spray bar moves under the control of a linear motion parallel gear drive system, powered by a gear box and motor with an electronic variable speed drive. A rotary encoder is connected to one of the screws that move the spray bar, so that the spray bar position and movement speed is continuously monitored. The cleaning system includes a source of cleaning solution and/or a source of catalyst solution. In the illustrated embodiment, the source of solutions includes a cleaning solution tank and, if catalyst is to be applied, a catalyst solution tank. Depending upon the solutions used, the tanks may be provided with motorized agitators to keep the solutions mixed. Gravimetric or other level indicators are provided to allow a control system or operator to monitor the fill level of the tanks. Each tank has a solenoid valve to turn on and off liquid flow and its own positive displacement pump controlled by an electric motor with an electronic variable speed drive. This allows the system to provide pressurized solution and to meter the volume of cleaning solution or catalyst solution pumped to the spray bar. The pressure and volume of the solutions pumped to the spray bar can be set and adjusted by changing the pump speed. A three way ball valve is used to deliver either cleaning solution or catalyst solution to the spray bar. If additional or varying cleaning and/or catalyst solutions are used, additional tanks or other sources of cleaning solutions and/or catalyst solutions can be included. Also, more than one spray bar can be used, to allow simultaneous spraying of different solutions.

The cleaning solution can be water by-itself, or water with an added cleaning compound, such as aqueous ammonia. Various other cleaning solutions can be used. Since the high voltage electrodes are hermetically sealed, the cells can be cleaned while in operation without electrical shorting problems. A control system allows a user to set and adjust the volume and delivery pressure of the cleaning solution. Operating pressures from about 5 to about 150 PSI have been found satisfactory, although higher pressures, such as pressures in the range of pressure washers (3500+ PSI), may be desirable for some applications. Excess cleaning solution either evaporates into the gas being treated or can be trapped and drained from a liquid recovery pan located in a duct underneath the NTP system.

If catalyst is being applied, after the electrodes are cleaned, the control system switches from spraying cleaning solution to spraying catalyst solution. At switch over, the liquid application rate and the spray bar movement speed can be varied as necessary to adjust the spray of catalyst solution onto the electrodes to achieve the desired catalyst coating on the electrodes. A liquid photocatalyst solution containing nano-particles of titanium dioxide has been found satisfactory for such application. The in place catalyst coating of the electrodes while the system is operating has been found to re-establishes the full in-plasma catalytic activity of the titanium coated electrodes. Various other catalysts and catalyst solutions may be used.

The electrodes may be cleaned and/or the catalyst may be applied when the NTP system is in full operation, and may be done on a intermittent basis, such as after every set amount of hours of operation, for example after every 200 hours of operation, or may be done continuously. At any time, as the spray bar moves along the electrodes, only a section of an electrode is sprayed and cleaned. A spray that sprays and washes a section comprising approximately 4 to 5% of an electrode's surface area at any particular position of the spray bar has been found satisfactory. This leaves approximately 95 to 96% of an electrode in normal operation. During system operation, a traveling spray bar, with a spray nozzle for each electrode gap (space between adjacent electrodes), travels back and forth over and along the electrodes. Both the speed of travel and the spray volume can be adjusted via the control system. With simple design changes, the section of an electrode being washed or undergoing catalyst application at any one point in time can be easily altered. In some applications it may be beneficial to continuously wash or add oxidation chemicals/catalyst materials over 100% of an electrode. In such a case, the spray nozzles can be fixed and there would be no requirement for a traveling spray bar.

While it is advantageous to use the system to wash and/or apply catalyst while the system is operating so as to avoid system shut down, the system can be used when the cell is de-energized in order to use cleaning materials and catalytic materials that may not be suitable for application while the system is operating. This can make it possible for extra-duty cleaning cycles and/or different catalyst applications that are not suitable for application while the system is under power.

As indicated in parent application Ser. No. 11/345,633, now U.S. Pat. No. 7,767,167, if the electrical system for the cells includes a plurality of individual NTP generating cells in parallel in each power circuit, a detector for detecting shorts that may occur in a cell may be provided by sensing the current to each of the plurality of cells. Under normal operating conditions, each of the plurality of cells will draw substantially equal current. If a short occurs in one of the plurality of cells, that cell will draw substantially more current than the remaining cells in that power circuit, although the total current draw in the power circuit may not change. In this manner, a cell with a short can be detected and control circuitry provided to shut down the system or to shut down the particular power circuit, and to provide a signal indicating a short condition.

THE DRAWINGS

Figure 2:
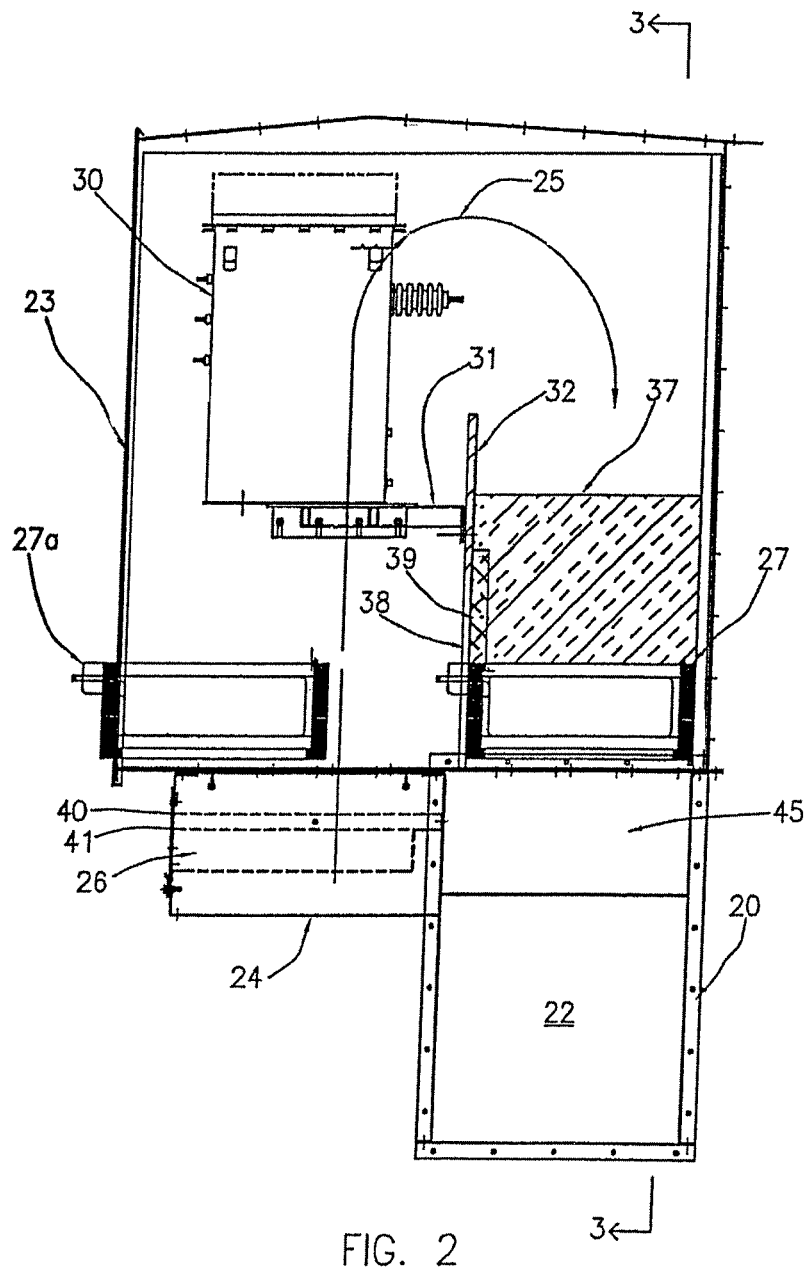
Figure 3:
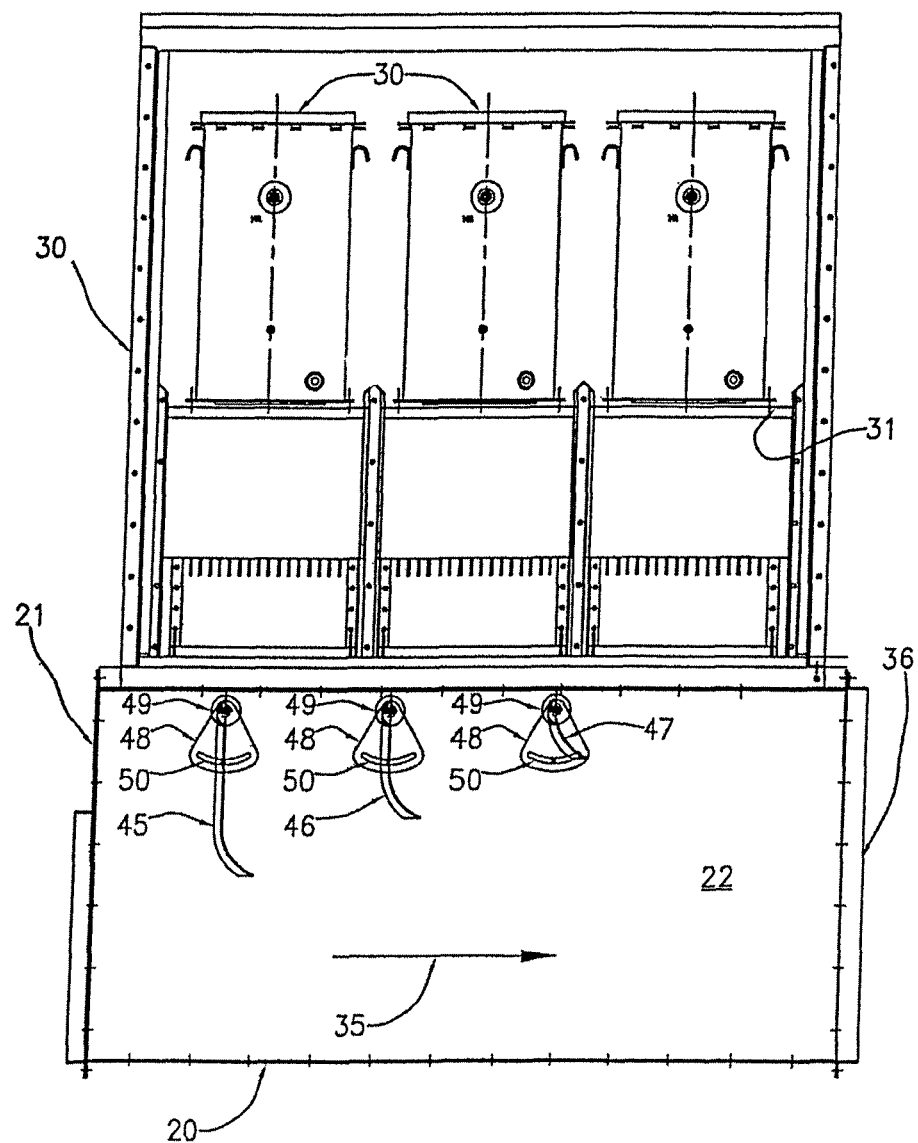
Figure 4:
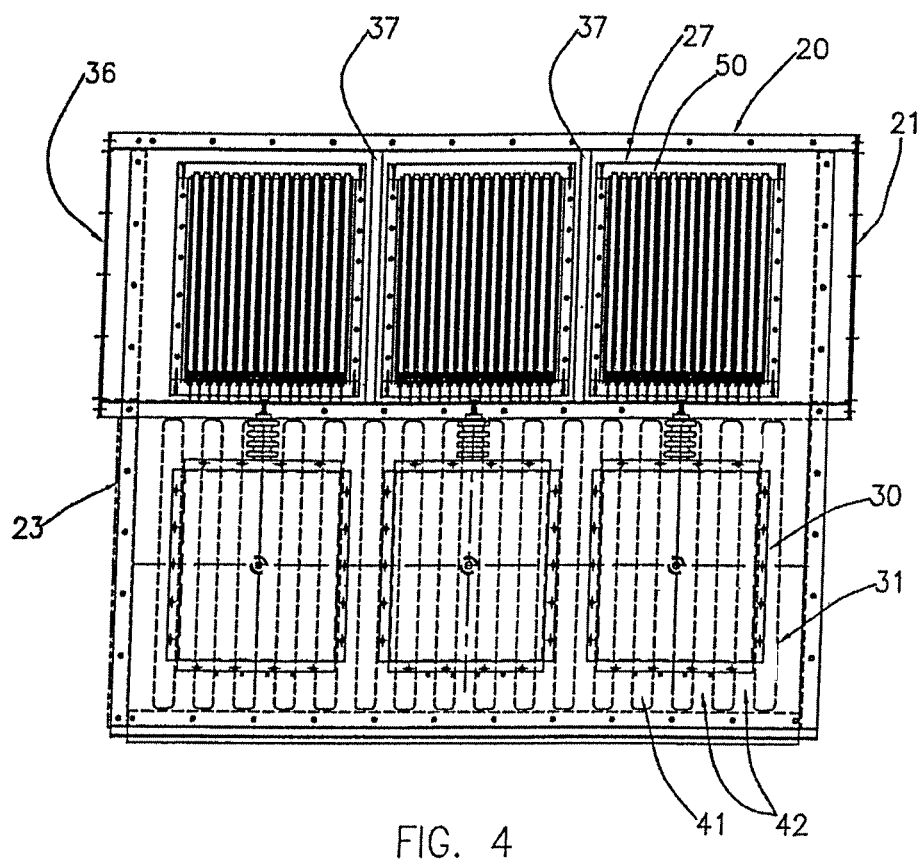
Figure 5:
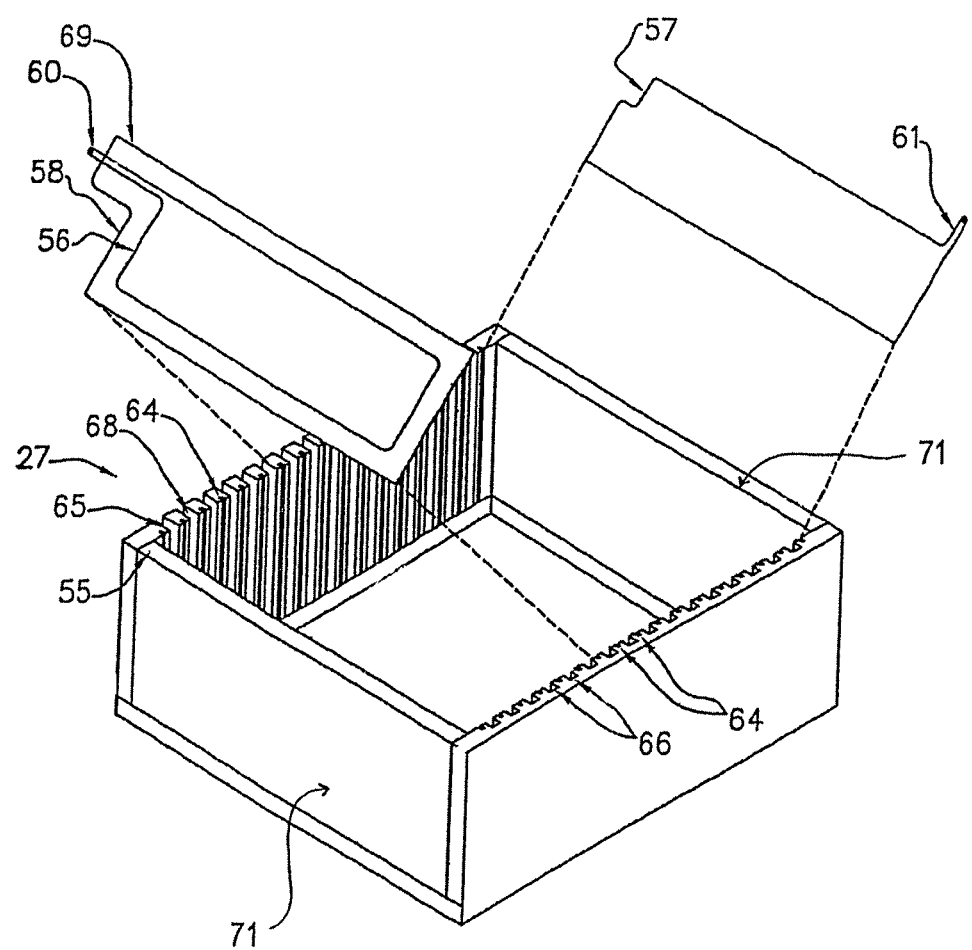
Figure 7:
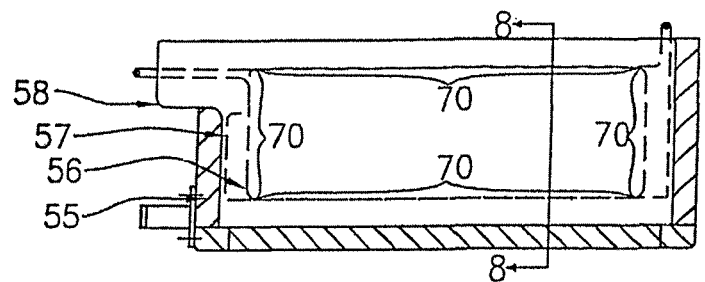
Figure 6:
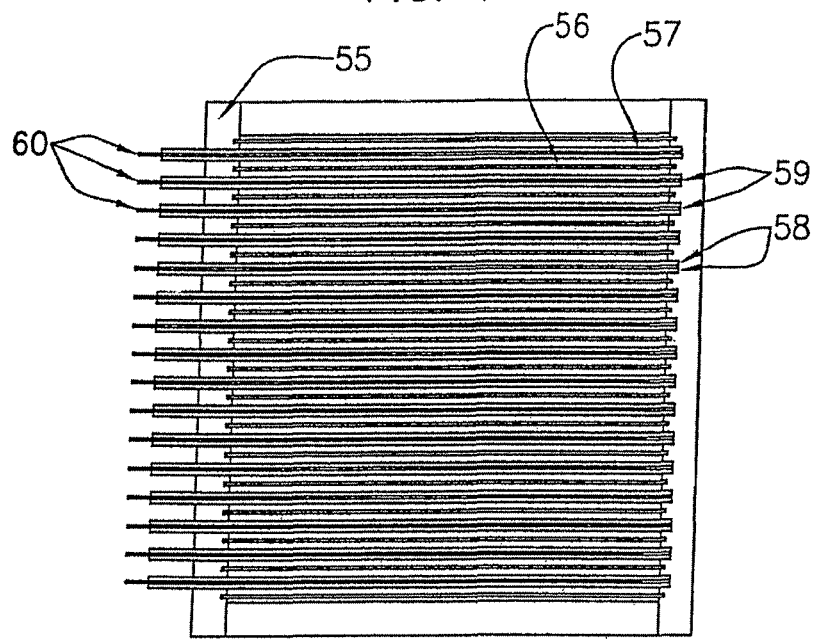
Figure 8:
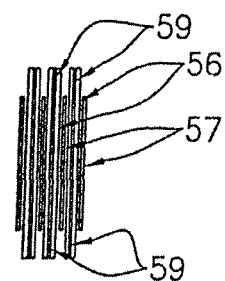
Figure 9:
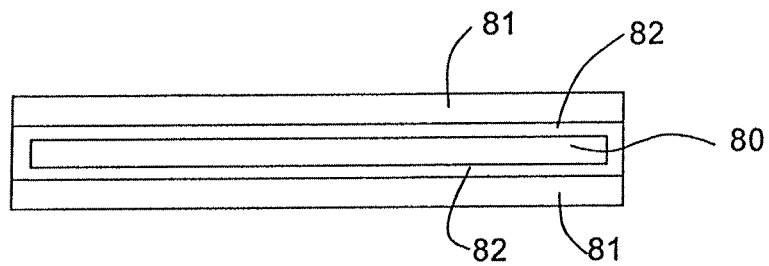
Figure 10:
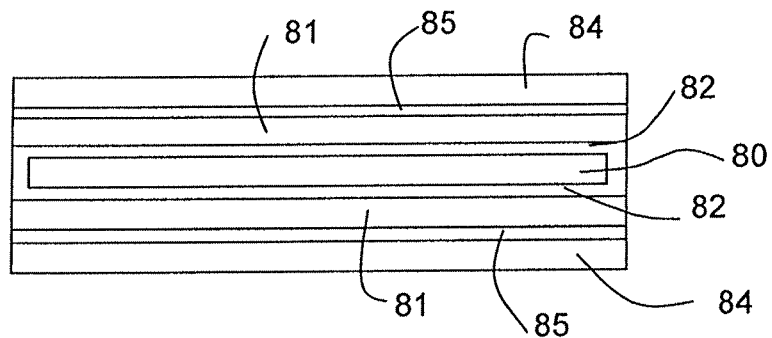
Figure 11:
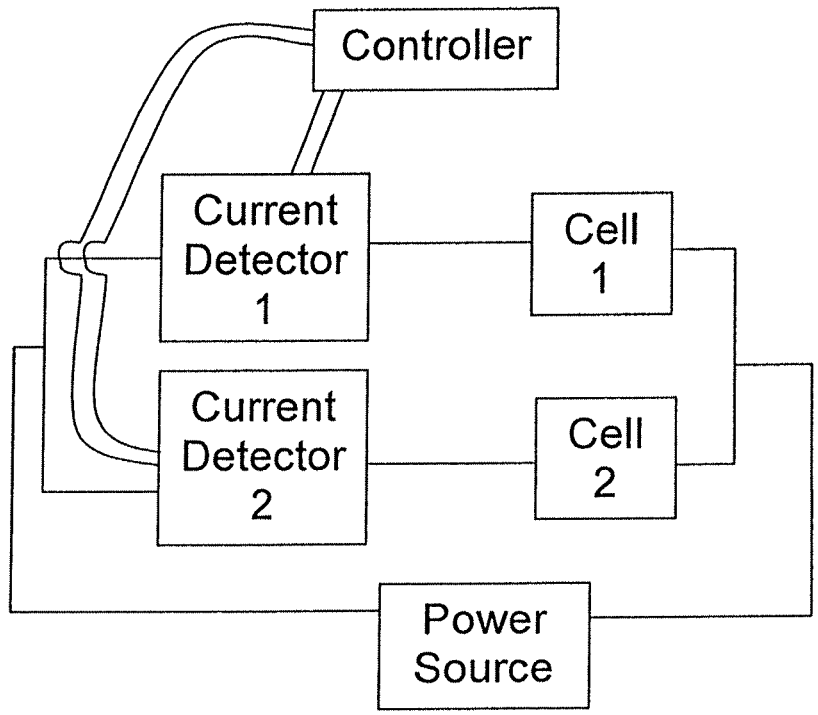
Figure 12:
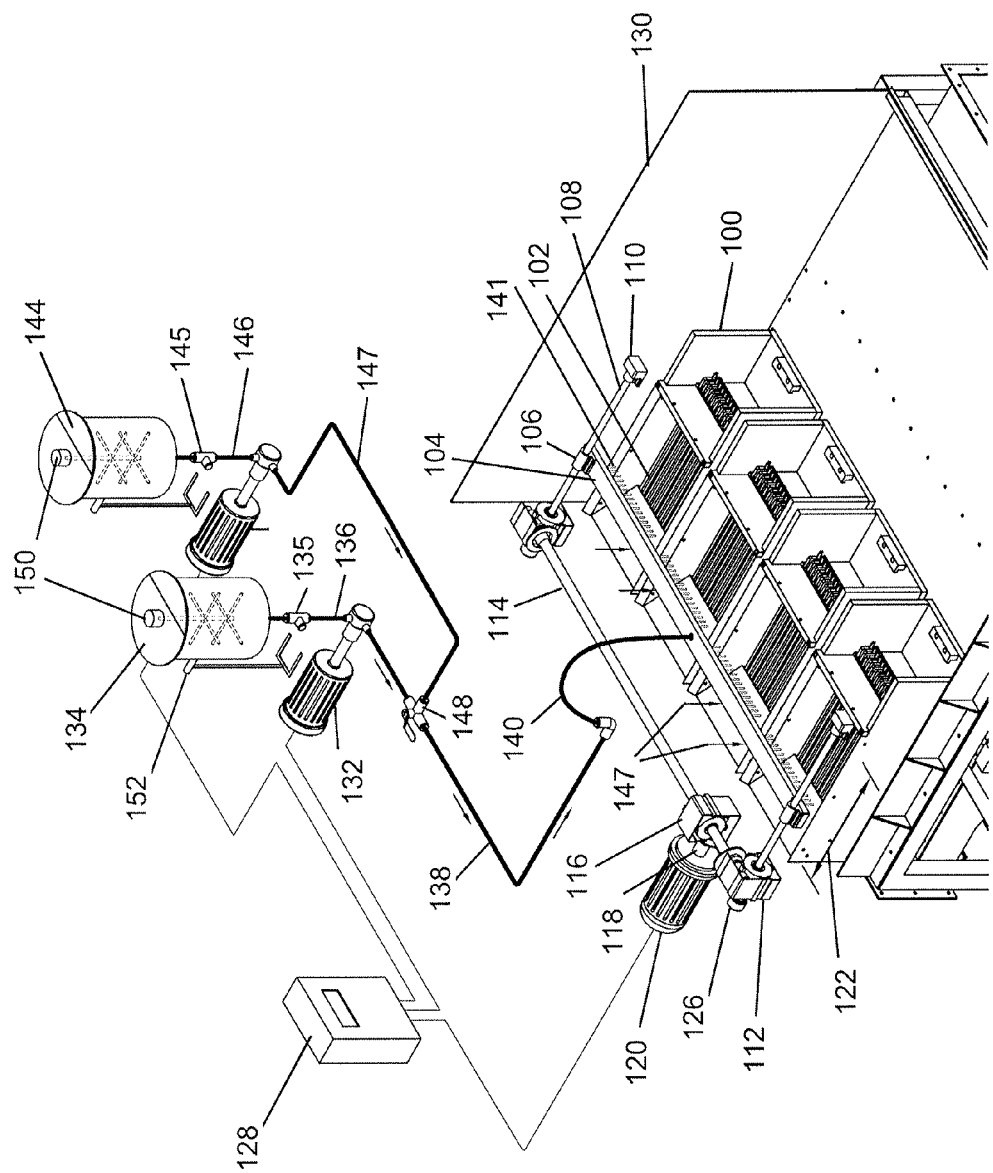

In the accompanying drawings, which show the best mode currently contemplated for carrying out the invention:

FIG. 1 is a side elevation of an apparatus of the invention with the upper side wall removed to show interior parts;

FIG. 2, a vertical section taken on the line 2-2 of FIG. 1;

FIG. 3, a vertical section taken on the line 3-3 of FIG. 2 through the side opposite that shown in FIG. 1;

FIG. 4, a horizontal section taken on the line 4-4 of FIG. 1;

FIG. 5, an exploded perspective view of a dielectric barrier discharge NTP generation cell (DBDPGC) housing showing how two of the electrodes would be positioned in the housing;

FIG. 6, a top plan view of a DBDPGC;

FIG. 7, a vertical section through the DBDPGC housing showing an electrode in elevation and a second electrode in broken lines;

FIG. 8, a fragmentary vertical section taken on the line 8-8 of FIG. 7, but showing only a few of the adjacent electrodes;

FIG. 9, a fragmentary horizontal section through an alternate construction of a "hot" electrode;

FIG. 10, a fragmentary horizontal section through a further alternate construction of a "hot" electrode;

FIG. 11, a block diagram of an electrode short circuit detector usable with the invention; and FIG. 12, a schematic showing of the automatic washing and catalyst application system.

DETAILED DESCRIPTION OF THE ILLUSTRATED EMBODIMENTS

A preferred apparatus of the invention includes a housing that forms at least one gas flow passage therethrough and a dielectric barrier discharge NTP generation cell (DBDPGC) through which at least a portion of gas flows. The apparatus can be configured so that all of the contaminated gas to be treated flows through the DBDPGC, only a portion of the contaminated gas to be treated flows through the DBDPGC, or none of the contaminated gas to be treated flows directly through the DBDPGC, but atmospheric air flows as the gas through the DBDPGC and is then mixed with the contaminated gas to be treated to treat that gas. The gas passing through the DBDPGC is activated so that the activated gas from the DBDPGC, when mixed with gas that has not passed through the DBDPGC, treats the gas that has not passed through the DBDPGC. In instances where less than all of the contaminated gas to be treated flows through the DBDPGC, a mixing chamber is included in the apparatus to mix the gas that flows through the DBDPGC with the contaminated gas that does not flow through the DBDPGC. FIGS. 1-4 show a preferred apparatus wherein all of the contaminated gas to be treated, only a portion of the contaminated gas to be treated, or atmospheric air is passed through the DBDPGC and, if less than all gas to be treated is passed through the DBDPGC, the gas passing through the DBDPGC is then mixed with the contaminated gas to be treated that has not passed through the DBDPGC to treat that gas. As specifically configured and shown in FIGS. 1-4, the apparatus passes atmospheric air through the DBDPGC and then mixes such treated atmospheric air with the contaminated gas to be treated. The advantage of treating either atmospheric air or only a portion of the contaminated gas in the DBDPGC is that less gas flows through the DBDPGC and is treated directly in the DBDPGC meaning that the size and air flow capacity of the DBDPGC does not need to be as great as when all gas to be treated flows directly through the DBDPGC. This is the usual configuration when the contaminants are of a low concentration in a large gas flow stream, so that the system component sizing is determined by the amount and type of contaminant needing to be treated, rather than the total gas flow involved. In the case where the contaminant is more concentrated, or needing higher eV energy to oxidize and/or reduce the components of concern, or of a sufficiently low volume, then all gas can pass through the NTP field to take advantage of the higher electrical efficiency realized when all gas passes through the NTP field.

As shown in FIGS. 1-4, the apparatus includes a main flue 20, adapted to be connected at an inlet end 21 to the source of contaminated gas to be treated, such as odorous exhaust gas emanating from a pet food dryer. The flue 20 forms a mixing chamber 22 for mixing gas that passes through the DBDPGC with the gas to be treated flowing in flue 20. A housing or cabinet 23 supports and completely encloses the high voltage and DBDPGC components of the apparatus. The low voltage electrical components and controls, including the power supply, are housed in a separate standard electrical cabinet. Atmospheric air enters the apparatus through inlet 24, and flows as shown by arrow 25 in FIG. 2 through filter 26 and DBDPGC's 27. During such flow, the air passes around transformers 30, supported by brackets 31, FIG. 2, secured to and extending from wall 32, to cool the transformers. Immediately after passing through DBDPGC's 27, the air flows into mixing chamber 22 where the air mixes with the contaminated gas flowing through the chamber as represented by arrow 35, FIG. 1. The air from mixing chamber 22, FIG. 2, passes into an exhaust flue, not shown, connected to outlet end 36 of flue 20, for discharge to the atmosphere. Mixing of the gases will continue through the exhaust flue. Generally a fan will be provided in the exhaust flue to draw the gases through the DBDPGC's and mixing chamber. The apparatus shown includes three DBDPGC's 27, FIG. 4, mounted side-by-side to handle the air flow through the apparatus. Divider walls 37 form individual inlets for the respective DBDPGC's. Wall 32 has openings 38 therethrough so that the DBDPGC's 27 can be slid into place or removed, 27a, FIG. 2, for maintenance. The front of cover 23 is removable, and interlocked to disable power, to provide access to the transformers and allow removal of the DBDPGC's as shown in FIG. 2. DBDPGC 27a is a DBDPGC 27 during removal. Wall filler 39 blocks opening 38 above DBDPGC 27.

The housing or cabinet 23 may be made of various materials, to be compatible with the process gas, but preferably of electrically conductive material such as stainless steel or other steel that can be securely grounded. All high voltage components are totally enclosed in this grounded cabinet to meet applicable industrial safety codes.

Flow of air through inlet 24 and through DBDPGC's 27 is controlled by a pair of slatted plates 40 and 41, FIGS. 2 and 4, which slide over one another to open or close the passageway from inlet 24. As shown in FIG. 4, the slats 41 are positioned directly over slates 40 so that slats 40 are not visible under slats 41, and the maximum flow openings 42 are created for maximum air flow. Sliding slats 41 over slats 40 will close flow openings 42 to any desired degree to adjust the air flow through the DBDPGC's.

To ensure substantially equal air flow through each of the DBDPGC's and to provide for good mixing of air from the DBDPGC's with the contaminated gases to be treated, baffles 45, 46, and 47, FIG. 3, are adjustably secured in mixing chamber 22 by brackets 48. The baffles are pivotally secured at their mounting ends by pins 49 and can be rotated about the pivot to the extent allowed by bracket slots 50. A pin or stop extends from each baffle into respective slots 50. The baffles are of different lengths, with the longest baffle 45 located at the inlet end of the mixing chamber, and are adjusted to provide substantially equal air draw for each DBDPGC 27. The flaps also cause turbulence in the exhaust gases flowing through the mixing chamber and guide the air from the DBDPGC's into the exhaust gas stream to provide better mixing.

Rather than passing atmospheric air into inlet 24 and through DBDPGC's 27, with the apparatus shown in FIGS. 1-4, it is easy to split the contaminated gas stream to be treated to direct a portion of the contaminated gas to be treated to the inlet 24, rather than drawing in atmospheric air, or in addition to atmospheric air. Such gas to be treated is passed directly through the DBDPGC's and is then mixed with the remainder of the gas to be treated in the mixing chamber.

Also, all contaminated gas to be treated can be directed to inlet 24 with the inlet 21 to flue 20 blocked. Thus, all gas to be treated is passed into inlet 24 and passes though the "hot" and "ground" electrodes of a DBDPGC, so substantially all such gases are exposed directly to the NTP generated by the DBDPGC's. Flue 20 does not act as a mixing chamber in this configuration in the same way it does in the configurations previously described. Alternately, the DBDPGC's could be mounted in flue 20 so that all gas entering flue 20 through inlet 21 would pass directly through the DBDPGC's. In such case, inlet 24 would be blocked or the apparatus would be configured to eliminate inlet 24. As previously indicated, in the configuration of FIGS. 1-4, the gases entering inlet 24 pass around transformers 30 to cool them. The gasses passing through the DBDPGC's also serve the important function of cooling the electrodes of the DBDPGC's. Thus, when the gases to be treated are passed directly through the DBDPGC's, care must be taken to ensure that the required cooling of the components needing cooling takes place. Where the contaminated exhaust gases to be treated are hot, adequate flow must be provided for cooling or the contaminated exhaust gases may need some cooling prior to treatment. Components such as the transformers 30 can be moved out of the gas stream and located elsewhere for cooling.

In general, the configuration that passes all gas to be treated through the DBDPGC's is more efficient in terms of energy required to neutralize the odor molecules and the organic compounds in the gas to be treated, as the electron activity in the NTP field assists in breaking the molecular bonds of the compounds of concern by direct ionization and the extremely short lived, higher energy radicals, those with half lives of 100 micro seconds or less, are available to effect the oxidation and reduction of the odor molecules and the organic compounds. In the bypass or partial bypass modes, the direct ionization of the gas to be treated does not occur and the short lived radicals have decayed and are not assisting with the oxidation and reduction of the odor molecules and organic compounds in the mixing chamber. In cases where the gas to be treated needs unusually high energy to be oxidized and/or reduced, such as in exhaust gases that would otherwise have to be incinerated to treat the gas, all of such gas must pass directly through the NTP, as it is only within the NTP where the direct ionization occurs and the ROS with the highest energy levels are developed and can oxidize and reduce those compounds that need these conditions to disrupt the bonds that need a higher energy level to oxidize and/or reduce them.

While the actual treatment of the gas to be treated may be more efficient in terms of energy required to neutralize the odor molecules and the organic compounds in the gas when all gas is passed through the DBDPGC's, large volumes of gas would require large numbers of DBDPGC's to provide the capacity necessary to pass all gas to be treated through the DBDPGC's. Thus, in such instances, and where all the gas to be treated does not necessarily need to pass through the NTP field to be effectively treated, a smaller amount of atmospheric air, or a smaller portion of gas to be treated, can be passed through a fewer number of DBDPGC's and such gas then used to treat the remaining gas by the mixing described.

Each of the DBDPGC's 27 includes a rectangular frame 55, FIGS. 5-8, enclosing and supporting a plurality of alternating electrodes 56 and 57. Electrodes 56 will be referred to as "hot" electrodes and electrodes 57 will be referred to as "ground" electrodes. Generally the "hot" electrodes will be at either a positive or a negative voltage with respect to the "ground" electrodes which are generally at electrical ground, however, the "ground" electrodes do not have to be at electrical ground and all that is necessary is that there is a voltage difference between the "hot" and "ground" electrodes during operation of the DBDPGC. With an AC voltage, the difference in voltage between the "hot" and "ground" electrodes will vary between positive and negative voltages. The "hot" electrodes 56 are hermetically sealed by an insulating material such as a borosilicate glass 58, on both sides of the conductor plate 56. A silicone sealing material 59, FIGS. 6 and 8, seal all glass edges. An electrical connection tab 60 extends from the glass which seals the "hot" electrode 56. The "ground" electrodes include electrical connection tabs 61, FIGS. 5 and 7.

DBDPGC frame 55 is formed of a nonconductive material such as ceramic, Teflon, or other plastic and has small grooves 64 to receive and support "ground" electrodes 57 and larger grooves 65 and 66 which receive and support opposite sides of hermetically sealed "hot" electrodes 56 as sealed by glass 58. Grooves 66 receive the side of the hermetically sealed "hot" electrodes without the electrical connection tab 60, while grooves 65 with the top portions 68 thereof extending through the wall of the frame 55, receive the side of the hermetically sealed "hot" electrodes with an extended end 69 extending through the through portions 68. It should be noted that the material hermetically sealing the "hot" electrodes extends beyond the perimeter of the "hot" electrode 56 so that when installed in frame 55, the "hot" electrode 56 is held in the frame but spaced from the frame.

It has been found that the hermetic sealing of the "hot" electrodes is essential to satisfactory operation of the DBDPGC in most situations as the air and/or gases normally being treated usually have contaminants in the gas passing through the DBDPGC. This is true even when the gas is atmospheric air. Contaminants can be condensing water or other condensing vapors, some contaminants can be particles of some kind, or there can be a mixture of both condensing fluids and particles. When at least one set of the electrodes are not hermetically sealed, it has been found that after a period of time in operation, the contaminants cause electrical short circuits in the DBDPGC's from "hot" electrodes, across the insulation and support frames to the "ground" electrodes. Hermetically sealing at least the "hot" electrodes prevents short circuits from occurring as no medium can contact the actual "hot" electrode conductor. The hermetic sealing normally incorporates borosilicate glass 58 to cover the internal stainless steel or other conductive material of electrodes 56 on both sides, with high voltage silicone sealant 59 around all glass edges, filling all gaps to provide the sealing of the conductive electrode part 56 within the dielectric. Alternatively, hermetic sealing could involve completely enclosing the stainless steel portion of the electrode in a ceramic similar to borosilicate glass. The key consideration is that, except for the electrical connection tab, all other parts of the electrode has the hermetic seal and dielectric integrity maintained so no short circuit by any conductive means, fluid and/or particle or any other medium in contact with the wetted, hermetically sealed electrode surface can contact or otherwise connect to the conductive part within. Note the electrical connection tab is not "wetted" by the gas stream being treated The "ground" electrodes 57 can also be hermetically sealed. As indicated, the "ground" electrodes do not actually have to be at ground potential. Further, sealing all electrodes, both "hot" and "ground" electrodes, will be required in cases where the contaminated gas to be treated is very aggressive and corrosive so would corrode exposed metal parts.

The physical matching of the electrodes is such that the NTP field formed between electrodes is confined to the area where the electrodes directly oppose each other through the dielectric medium and as such, this geometry serves to control the NTP and keep it away from the support frame so the frame does not suffer damage from the NTP field. The area of NTP generation is only the area enclosed by lines 70 in FIG. 7, i.e., the area inside the perimeter of the "hot" electrodes.

The excitation of the electrodes will vary according to the application. The "hot" electrodes and "ground" electrodes will have opposing polarity so that a NTP forms in the directly opposing areas between the electrodes. The electrodes can be excited by alternating current of either sine wave, square wave, or other wave shape as deemed effective, with the "hot" electrode being either positive or negative with respect to the "ground" electrode at any given instant of the alternating current cycle. The voltage between electrodes should be at least about 4,000 volts and usually will be in the range of between about 4,000 volts and about 100,000 volts, and in some cases higher, which is determined by the actual cell geometry required for a given application. The frequency should be between about 50 Hz up to about 50,000 Hz, and in some cases, higher.

It has been found convenient to group the DBDPGC's in groups of three where each DBDPGC is powered by one phase of a three phase power supply. For the embodiment shown, FIGS. 5 and 6, there are sixteen "hot" electrodes, with seventeen "ground" electrodes for each of three DBDPGC's, each DBDPGC powered by one phase of a three phase system. In this arrangement, the "ground" electrodes will actually be electrically connected to ground. When energized, these electrodes form the NTP field in the directly opposed areas between the electrodes, i.e., the area enclosed by lines 70 in FIG. 7. It has been found satisfactory to use a 2000 hertz sine wave, with a root mean square voltage of 18,000 volts. Alternatively, the ends 71, FIG. 5, of the DBDPGC frame 55 may be made of a conductive material similar to ground electrodes 57 and be electrically grounded so as to actually form the two end ground electrodes. In such situation, separate end ground electrodes 57 are not necessary and there will be one less ground electrode 57 than hot electrode 56 since the ends 71 replace the end ground electrodes 57.

A satisfactory power supply includes a transformer 30 for each DBDPGC powered by a frequency invertor that is capable of driving a transformer load. Depending upon the transformer used, an additional inductive reactance in series with the primary may be necessary so that the combined inductive reactance of the transformer and extra inductor nearly matches the "live" capacitance of the DBDPGC's, thus the system runs at "near" electrical resonance to get maximum power into the NTP. The term "live" capacitance is needed, as the capacitance of the "hot" and "ground" electrodes, when assembled in their frame and measured when the system is not powered, differs from that measured when the system is in operation. This is because the NTP changes the capacitance of the DBD when in operation so that must be matched by the inductance and frequency when in operation to achieve the desired NTP level.

The three transformers, one for each phase, have the primary windings connected in delta arrangement, with the three inductors, if necessary, in series with each transformer primary (through a PLC controlled contactor), while the transformer secondary windings are connected in grounded wye arrangement. In the event of any failure in one of the "hot" electrodes, the failed phase will go out of resonance operation, its power will drop and the current drop to the faulted phase will be detected. A programmable logic controller (PLC) monitors the difference and will disconnect the faulted phase. The remaining two phases will continue to operate at the power level set. In the event another "hot" electrode loses it's dielectric integrity and shorts out, that phase also will be disconnected by the PLC, so that the system can operate with two failed phases, on a single phase and single DBDPGC. The PLC monitors all currents to the primary of the transformers, selects the maximum current and modulates the signal to the invertor so that it remains at the setpoint entered. Changes in the gas being treated, such as temperature, humidity, plus the effects of component heating (transformers & inductors) can cause variations in the NTP developed and the power consumed, and this is held steady by the PID control algorithm calculated by the PLC.

The voltage to the primary of the transformers is varied by the width of the pulses delivered to the transformer, through the PLC PID algorithm that controls the power invertor and this in turn adjusts the voltage output of the transformers, hence to the "hot" and "ground" electrodes, which adjusts the level of the NTP produced. Typically, a closed PID control loop that monitors the actual power output of the invertor is measured and controlled to a power level setpoint that can be cascaded from another control loop from an ozone sensor, or the setpoint can be manually entered. Other system states, such as contactor status, for incoming power to the invertor, contactor to each of the transformer/invertor phases is also monitored and displayed by the PLC system. An important interlock monitored by the PLC is the DBDPGC differential pressure, which represents the gasflow through the DBDPGC's. Normally, this number (three) of DBDPGC's needs a minimum of 3000 ACFM of gas for electrode cooling at 70 degrees F., but a flow of 5000 ACFM is preferred. In this embodiment, this results in a differential pressure of 0.8 inches of water at 3000 ACFM and up to 1.5 inches of water at 5000 ACFM. The gas must be filtered to the extent of removing coarse particles and debris that might not pass between the gas flow space separating the "hot" and "ground" electrodes. Should the filter clog and the system draft not pass enough gas through the DBDPGC's, as indicated by a drop in differential pressure, the PLC will sense this and disable the power to the unit and present and alarm indication. This is needed, otherwise the DBDPGC's will overheat and the dielectric hermetic seal of the "hot" electrodes will break, destroying the dielectric integrity resulting in malfunction.

This embodiment as described will be rated for 25 kilowatts, measured as the power input to the invertor. Such system has been successfully used to treat odor from a pet food production facility, treating 20,000 ACFM of air that was used to dry and cool the feed.

Other embodiments are possible, with different DBDPGC dimensions, different airflows, different power densities and different power ratings. Single-phase units, for small airflows, are possible, typically using power from 500 watts up to approximately 3000 watts. Systems needing more power are typically powered with three-phase power, though some power supplies, accepting three phase in and single phase out, with different power electronics, such as SCR control and different IGBT arrangements and much higher frequencies, are possible.

In choosing a power and gas flow design to implement in a given application that needs odor/VOC abatement, the following considerations are important:

Due to the wide ranging nature of differing industrial odors and the inexact science of determining the specific composition, potency, and the energy needed to oxidize and/or reduce a given mix of odorous complex organic molecules and/or VOCs, the systems are sized for unknown odor applications by operating a pilot sized system at the odor site.

The pilot sized system has all the same flow paths as the full-scale system and is operated with a scaled down, known odorous and or VOC laden airflow from the process to be treated in concert with adjustable power and frequency levels with various air flow configurations to determine the optimum operation configuration, residence time and joules per liter density required to treat the gas.

The determination of the appropriate mix and flow of odorous and/or non-odorous air to the pilot inputs depends on the nature and potency of the odors. In cases where the odor is highly concentrated and cannot be treated by any other means, except, possibly incineration, or if the odorous air flow can all pass through the DBDPGC cell, then it is best to configure all odorous air to pass through the DBDPGC.

In applications where the odor is diluted and of a potency that does not need to be passed directly through the DBDPGC to be neutralized and the air stream is large, then the system may best pass only ambient air through the DBDPGC and inject the Activated Oxygen and Hydroxyl Species (AOHS) formed by the DBDPGC into the odorous air stream to provide the treatment. This configuration can also have odorous air pass through the DBDPGC in place of ambient, non-odorous air and achieve the same effect.

In applications where some extremely high concentration or difficult to oxidize and/or reduce odors and/or VOCs need to be treated, that are only treatable otherwise through incineration, then such must pass entirely through the DBDPGC, as only the most active AOHS that operate entirely within the NTP field will neutralize such difficult odors or VOCs. In such applications, the lesser reactive AOHS species may still exist in the air exiting the DBDPGC, so it is useful to process some less concentrated, or odors that do not require the most energetic ROS to be treated at that point, and they are admitted to the Odor Removal System through the DBDPGC bypass input. In this configuration the pilot and full scale Odor Removal System will treat both odor sources at the same time.

Once an energy level has been established for given air flow rates to each system input for a given odor source or combination of sources, the full scale system can then be sized.

The system illustrated in FIGS. 1-4 is in a bypass system configuration, using a total of 5000 actual cubic feet of atmospheric air per minute (ACFM) through the DBDPGC's, to be activated by the NIP to create the reactive oxygen species that are mixed with the gas to be treated. The treated gas volume can be from 5000 ACFM up to 50,000 ACFM, depending on the concentration of the odor or VOC needing treatment. This same configuration could also pass gas in a mix, in that some of the gas to be treated flows through the NTP field. In this configuration, the gas passing through the NTP field is not only treated to remove the pollutant of concern, but also is activated so that it can treat other air.

A further feature of the invention is that the efficiency of the odor removal can, with some odors and/or VOCs, be directly monitored and automatically controlled using an ozone monitor. Ozone is one of the longest-lived ROS species that are formed to treat the odorous gas and there is usually a small amount of residual ozone in the treated gas stream when enough ROS has been created to neutralize the odor and/or VOC levels in the case of odors and/or VOCs that are treatable with the longer lived ROS species. As the power applied to the DBDPGC's controls the amount of ROS produced (within the limits of the DBDPGC's power handling rating), the power can be modulated automatically to maintain a small residual ozone level, to match EPA or local authority guidelines. Since adjusting the power to the DBDPGC's controls the NTP level, hence the amount of ROS created, then the level of ROS required to treat any combination of gas flow and contaminant level is modulated so enough ROS is produced to fully oxidize and/or reduce the odors and/or VOCs contained in the gas stream and leave a small residual ozone in the discharge. In the case where the small residual ozone drops, it means that there is an increase in the odor and/or VOCs to be treated so the automatic control loop can increase power to the DBDPGC's to increase the NTP field which in turn generates more ROS species to meet the treatment demand. In the case where the residual ozone increases, then the odor and/or VOC load has decreased so the automatic control can reduce the power to maintain the small residual ozone setpoint to stay within authority limits for ozone emissions. In cases where the gas to be treated must all pass through the NTP field for effective treatment, due to the high energy requirement of the ROS species, then it might not be possible to close the control loop using ozone as the process variable, as the gas being treated would not consume the lower energy ROS species of which ozone is a member. In such cases a manual operation level might have to be set.

Also incorporated into the control of this invention is a Programmable Logic Controller (PLC) that interlocks all safety devices and controls the on/off functions of the system according to factory needs. In other words, it will automatically shut down when the factory halts production and/or isolate a fault and give an alarm message if such occurs in the system.

The system of the invention can be added on to existing factories or integrated as part of a new plant design. The changes in equipment are minimal to integrate this technology into a factory and the only operating consumable commodity is electricity. Further, the technology is scalable to any size from small domestic sized units for kitchen odors of a few hundred ACFM, all the way to the largest factories that release tens of thousands of ACFM and more of odorous and/or VOC pollutant laden air into the environment. When large volumes of air, and/or extremely high odor load in combination with large air volumes must be treated, multiple units can be combined in parallel to treat the air.

FIGS. 9 and 10 show alternate hermetic sealing embodiments for the invention. It has been found that even with the hermetic sealing of the "hot" electrodes, hot spots or streamers will sometimes form. A streamer is a discharge spark that stays in one place on the plasma cell electrode for a considerable period of time due to an imperfection or anomaly in the cell construction or build up of foreign material or oil, dust, etc. This can attract a continuous charge to one spot on the "hot" electrode. Alternately an artifact or particulate matter that appears from time to time passing between the "hot" electrode and the ground electrode in the cell may concentrate a charge or a streamer in an area of the plate. When rigid glass is used to form the hermetic seals around the electrodes, the formation of a hot spot heats the glass at the location of the hot spot causing the glass at that location to expand. The remaining glass does not expand and the glass can crack or shatter. This then destroys the hermetic sealing of the electrode, causes arcing and damage to the electrode and cell, and interferes with the generation of the plasma. It has been found that the reliability of the cell can be significantly increased by hermetically sealing the "hot" electrode in a rubber or rubber type material such as a siloxane material. Referring to FIG. 9, the internal conductive portion 80 of the "hot" electrode has a piece of siloxane sheet material 81 secured to both sides thereof by a layer of silicone gel or silicone adhesive material 82 which secures the siloxane sheet material 81 to the conductive material 80. The silicone adhesive material 82 extends around the edges of the conductive material 80 to completely surround and hermetically seal the conductive material, except for the electrical connection tab as previously explained. Basically, the siloxane sheet material is used in place of the borosilicate glass shown and described in the previous Figs. The silicone gel or adhesive material 82 is the same as the silicone sealant 59 shown in and described for FIGS. 5-7. The siloxane material is flexible enough so that if a hot spot develops on the "hot" electrode, the siloxane material will not break, crack, or shatter as will the glass. Thus, the hermetic sealing will not generally be destroyed, or at least it will maintain its hermetic seal for a longer period of time requiring the hot spot to burn through the siloxane material before the hermetic seal is broken.

If desired to provide a smooth and/or hard surface to the "hot" electrode, plates 84 of a ceramic material, such as borosilicate glass, can be laminated to the electrode of FIG. 9 with silicone adhesive 85, as shown in FIG. 10. Generally such additional ceramic plates will not be used. However, whether or not ceramic material is used will depend on the viscosity and the constitution of the process gas stream passing through the cells. If there are impurities such as grease or wax that may accumulate on the siloxane material, a glass or borosilicate layer may be used. If the only thing that is passed over the electrodes is filtered air or gases then the silicone sheet itself is all that is required. When velocity is important, the glass will generally provide higher velocities of air or process gas flow through the cell because of the smoother surface. If the electrode includes an outer layer of ceramic material as shown in FIG. 10, even if the ceramic material breaks, cracks, or shatters, the siloxane material maintains the hermetic seal for an additional time period. The use of the siloxane material has been found to provide a more reliable cell than use of rigid ceramic material as the only seal.

Various siloxane materials or equivalent materials (referred to as rubber materials or rubber dielectric materials) can be used for the hermetic seal. The important feature is that the material acts to form a hermetic seal under the conditions that exist in the cell for a particular use. The material provides electrical isolation to the electrically conductive part within the "hot" electrode. It is desirable that the siloxane material have a high dielectric strength, high temperature resistance (often to 400 degrees F. or 500 degrees F., ozone resistance, UV light resistance, hardness of from 30-40 to 70 durometers or more, and a thickness dependant on the specific application. DSP50FDA from Diversified Silicone Products of Santa Fe Springs, Calif., Product Number 8774 from Miller Polymer Corporation of Burlington, Ontario, Canada, and various products from Dow Corning have been found satisfactory. The siloxane material can be either high dielectric room temperature vulcanized Siloxane or high dielectric high temperature vulcanized Siloxane commonly known as Silicone Rubber Sheeting. Such material may be a polymer matrix of silicone primarily formed from polydimethylsiloxanes [SiO(CH3)2]n (n=2, 3, 4, 5, . . . ) in its various chain lengths to include all formations of this compound. Sheets of this material 1 mm or more in thickness has been found satisfactory. The thickness required will depend upon the cell construction and the voltage expected to be applied to the electrodes. The greater the voltage and the greater the power expected to be used in a cell, the thicker the dielectric material should be. The silicone gel, adhesive, or sealant material may also take various forms. A silicone liquid or gel material that can be injected into a mold holding the conductive portion of the electrode and the sheets of siloxane material to bind the sheets of siloxane material to the conductive material has been found satisfactory. However, silicone or other sealant material can be spread over the conductive material to secure the siloxane sheet to the conductive material and to seal the spaces between the siloxane sheets. Further, a layer of siloxane material could be formed on the conductive material by dipping the conductive material in a bath of liquid silicone material or gel silicone material, and repeating the dipping process until the layer has built up to the desired thickness.

In many instances, a number of cells will be connected to form a treatment or purification system. When a number of cells are connected to a single transformer power output as the power source, if the cells are connected in parallel, as are cells 1 and 2 in FIG. 11, it has been found that while the total power output from the power source may remain the same if a short develops between electrodes in one cell, such as due to shattering of the glass if the glass hermetic sealing is used or the burning through of the siloxane material if siloxane is used for sealing, that the current flow will shift so that the cell with the short will draw more current than the cell or cell without the short. With no shorts, all cells will draw substantially the same current. A short detector can be formed by measuring the current to each of the individual cells. In the circuitry of FIG. 11, current detector 1 measures the current flowing to cell 1 and current detector 2 measures the current flowing to cell 2. The outputs of the current detectors which are indicative of the current flow are sent to the controller, which may be hard circuitry or may be a programmable logic controller or other microcontroller, such as a microcontroller controlling the entire operation of the system, which determines if a short occurs in a cell and then shuts down the system or the power to the cell having the short and cells powered in common with the cell having the short. The controller would also provide a signal indicating that a short has occurs. Detection of shorts in a cell is important because if a short occurs, the cell can quickly become damaged and in some cases a fire can start.

While the particular embodiment of the invention described has been directed to treatment of odor and volatile organic contaminants, in process gases, the same or similar equipment can be used for air purification and surface sterilization. It has been found that non-thermal plasmas from NTP generation cells can be used to purify gases and sterilize surfaces. The NTP and ROS will destroy airborne and surface microbes such as bacteria, molds, yeasts, and viruses. Gases passing through the NTP generation cells are purified and items to be sterilized can be placed in the NTP generations cells or the gases from the NTP generation cells can be circulated around the items to be sterilized to sterilize the items. For example, a gas such as air, nitrogen, or argon can be circulated and recirculated through the NTP generation cell and circulated and recirculated around an item to be sterilized.

While the invention has been described as apparatus for treatment of odor and volatile organic compound contaminants in gas emissions or the sterilizing of items, the invention can be used in a variety of other applications to oxidize and/or reduce a compound or compounds of concern to a desired form. One such application would be to reduce the hydrocarbon content in air emission applications to an acceptable level prior to release into the atmosphere. Gas fumes such as combustibles and even H2S from oil wells or other processes can be oxidized and reduced using this technology that otherwise would require burning or flaring prior to being discharged into the atmosphere. In many cases, additional fuel, such as propane, is needed to keep a flare in combustion when the concentration of combustibles in the gas to be emitted falls below the ignition point. With this technology, an ignition concentration is not required to fully oxidize and reduce the gas, the NTP is able to fully oxidize and reduce the gas to be treated regardless of the hydrocarbon level. Other hydrocarbon compounds, such as those containing chlorine and fluorine are also treatable by this invention.

While the hermetic sealing of at least the hot electrodes in the dielectric barrier discharge plasma generation cells (DBDPGC) where the contaminated gases to be treated pass over or along such electrodes is generally effective in preventing shorts due to build up of contaminants in the cells and is generally effective in extending the life of the electrodes and the DBDPGC cells and extending the operation time of the cells, it has been found that still, when DBDPGC electrodes are operating, air stream contaminants and plasma field induced chemical reaction by-product compounds can and do adhere to the surface the high voltage and ground electrodes. As deposits on the electrodes accumulate, the glow discharge (millions of random tiny micro discharges) gradually changes to a much smaller number of concentrated, stationary point discharges. During prolonged system operation the glow discharge gradually changes to a much smaller number of point discharges. When this occurs, the volume of desirable plasma induced chemical reactions decreases by about 50% or more, dramatically reducing the destruction efficiency of the targeted Volatile Organic Compounds (VOC) compounds that the system is designed to oxidize.

Depending upon the concentration and the unique mixture of chemical compounds in the contaminated air stream being treated by the NTP system, electrode cleaning can be required after about 200 to 500 hours of operation to maintain the efficiency of the cell. While this is a great improvement over cells where electrodes are not hermetically sealed, manual cleaning of the electrodes is a time consuming and labor intensive process. Further, it requires significant system down time. This is of particular importance because in many cases the NTP system is used to treat exhaust gases from processes that operate continuously, with high costs associated with stopping plant operation.

Additionally, it has been found that applying a catalyst to the electrodes in a non-thermal plasma cell can increase VOC destruction, alter the type and concentration of NTP by-products, and reduce the energy required to achieve target VOC destruction levels by as much as 20 to 50+%. However, it has also been found that in full scale industrial applications of NTP systems, in-plasma catalytic material surfaces become coated by NTP break down products. In relatively short periods of time catalytic activity is significantly or totally impaired. One effective catalyst is titanium dioxide. In the case of titanium dioxide as a catalyst, the electrodes must be cleaned and the nano-particle titanium dioxide coating must be re-applied frequently. However, again, if this work is completed manually, significant labor and system downtime costs are incurred.

FIG. 12 is a somewhat schematic showing of an electrode washing and catalyst applying system for a NTP system having four side-by-side DBDPGC cells 100 each having a plurality of alternating ground and hot electrodes 102 as previously described. Spray bar 104 is mounted as part of a linear motion parallel gear drive assembly above the cells 100. The ends 106 of spray bar 104 are threaded onto threaded shafts 108. Threaded shafts 108 have one end mounted in bearings 110 with the opposite ends attached to ninety degree elbow gearboxes 112, each of which is attached to a transverse shaft 114 extending from gearbox 116. Gearbox 116 is coupled through shaft 118 to motor 120 such that rotation of motor 120 causes rotation of transverse shaft 114, which causes rotation of each of threaded shafts 108. As threaded shafts 108 rotate, the spray bar 104 moves along the threaded shafts 108 in one of opposite directions indicated by arrow 122. Thus, motor 120 can be controlled to move spray bar 104 back and forth over and along the lengths of the electrodes 102. A rotary position encoder 126 sends signals to the controller 128 so controller 128 can keep track of the position of the spray bar 104 along the length of threaded shafts 108 and the speed the spray bar is traveling. The end bearings 110, gearboxes 112, gearbox 116, and motor 120 may be mounted to the DBDPGC cells 100 or to the system structure 130 in any suitable manner.

Cleaning solution pump 132 connects cleaning solution tank 134 through solenoid valve 135, pipes 136 and 138, and flexible tube 140 to spray bar 104. When it is desired to spray cleaning solution onto electrodes 102, the controller 128 operates solenoid valve 135 and pump 132 to pump cleaning solution from cleaning solution tank 134 to spray bar 104, while motor 120 operates to move the spray bar 104 and the spray 141 of cleaning solution spraying therefrom along the electrodes 102. Spray bar 104 directs a spray 141 of cleaning solution onto the top of confronting electrode surfaces of side-by-side (adjacent) electrodes to run down the electrode surfaces by gravity and clean the surfaces of air stream contaminants and DBDPGC cell reaction by-products that have built up on the electrode surface. The flow of gas downwardly through the DBDPGC cell as indicated by arrows 142, and as previously described, also helps the flow of cleaning solution down the surfaces of the electrodes. Some of the cleaning solution will evaporate into the gas being treated while cleaning solution reaching the bottom of the electrodes will drop off the electrodes and may be collected and drained from a liquid recovery pan, not shown, located in a duct underneath the DBDPGC cells or the NPT system. Cleaning solution pump 132 may be a positive displacement pump to provide accurate delivery of cleaning solution.

The cleaning solution can be water by-itself, or water with an added cleaning compound, such as aqueous ammonia. Various other cleaning solutions can be used. Since the high voltage electrodes are hermetically sealed, the cells can be cleaned while in operation without electrical shorting problems. The volume and delivery pressure of the cleaning solution can be set and adjusted by a user through the controller 128 which controls operation of cleaning solution pump 132. Operating pressures from about 5 to about 150 PSI have been found satisfactory, although higher pressures, such as pressures in the range of pressure washers (3500+ PSI), may be desirable for some applications.

As indicated above, a coating of catalyst particles on the electrodes of a non-thermal plasma system cell can increase VOC destruction, alter the type and concentration of NTP by-products and reduce the energy required to achieve target VOC destruction levels. In many instances, destruction efficiencies are improved by 20 to 50+% by adding in-plasma catalysts. However, the use of catalytic material on the electrode surfaces results in such surfaces becoming coated by NTP break down products faster than when catalyst is not used. This causes, in relatively short periods of time, catalytic activity to be significantly or totally impaired. In the case of titanium dioxide as an in-plasma catalyst, the electrodes must be cleaned and the nano-particle titanium dioxide coating must be re-applied frequently. Where the use of a catalyst is desired, the system can also include a catalyst solution pump 143 which connects catalyst solution tank 144 through solenoid valve 145, pipes 146 and 147, and three way valve 148, to pipe 138 and flexible tube 140 to spray bar 104. When it is desired to spray catalyst solution onto electrodes 102, the controller 128 operates catalyst pump 143 and three way valve 148 to pump catalyst solution from catalyst solution tank 144 to spray bar 104, while motor 120 operates to move the spray bar 104 and the spray 141 of catalyst solution spraying therefrom along the electrodes 102. Spray bar 104 directs the spray 141 of catalyst solution onto the top of confronting electrode surfaces of side-by-side electrodes to run down the electrode surfaces and coat them with the catalyst particles. As with the cleaning solution, the volume and delivery pressure of the catalyst solution can be set and adjusted by a user through the controller 128 which controls operation of catalyst solution pump 143. Catalyst solution pump 143 may be a positive displacement pump to provide accurate delivery of catalyst solution.

With the spray bar as described, cleaning solution or catalyst solution is sprayed onto only a section of the electrodes to be cleaned or coated at any particular time. As the spray bar moves, the spray of solution from the spray bar moves, over a period of time, in a manner to spray the various sections of the electrodes to be cleaned or to be coated with catalyst. With the arrangement shown, a section of the electrode making up only about 4 to 5% of the electrode surface areas are washed or coated by the direct spray at any particular time. This leaves about 95 to 96% of the electrodes in normal operation. However, the spray bar or other nozzles use to spray cleaning solution or catalyst solution onto the electrodes may be configured to spray various sized electrode sections, which in some cases may range up to a section encompassing all of the gas flow portion or hermetically sealed portion of the electrodes. Further, the system may spray sections of different size when spraying cleaning solution and when spraying catalyst solution.

The electrodes may be cleaned and/or the catalyst may be applied when the NTP system is in full operation, and may be done on a intermittent basis at set periods of time, such as after every set amount of hours of operation, or may be done on a continuous basis. In some applications it may be beneficial to continuously wash or add oxidation chemicals/catalyst materials over 100% of electrodes. In such case, the spray nozzles can be mounted in fixed positions as there would be no requirement for a traveling spray bar or other nozzle.

While it is advantageous to use the system to wash and/or apply catalyst while the system is operating so as to avoid NTP system shut down, the washing and coating system can be used when the DBD cell is de-energized (not operating) in order to use cleaning materials and catalytic materials that may not be suitable for application while the system is operating. This can make it possible to perform extra-duty cleaning cycles and/or different catalyst applications that are not suitable for application while the system is under power.

It should be noted that, depending upon the nature of the cleaning solution and the catalyst solution, and various cleaning and catalyst solutions can be used, an agitator or mixer 150 may be used in the catalyst solution tank and/or the cleaning solution tank to keep the solutions mixed when in the tanks. Further, separate spray bars can be provided for cleaning solution and for catalyst solution, and various other nozzles in various arrangements can be used for spraying or otherwise applying solutions to the electrodes. In addition, it is generally important to know when the tanks are nearing empty so the tanks can be filled. This allows continued cleaning and catalyst application. Various ways of measuring solution levels in the tank can be used, such as gravimetric level indicators, to provide signals to the controller 128. For example, the cleaning solution tank and the catalyst solution tank may be mounted on a base using a load cell mount 152 that measures the weight of the tank. The measured weight of the tank then indicates how full the tank is. An indication can then be given by the controller when a tank needs to be refilled. Alternately, the indicator can provide only a visual indication that can be observed by the operator. The controller can include a microprocessor or other computer and various interfaces so an operator can enter operating instructions and information into the controller and can enter instructions as to various operating adjustments.

Whereas the invention is here illustrated and described with reference to embodiments thereof presently contemplated as the best mode of carrying out the invention in actual practice, it is to be understood that various changes may be made in adapting the invention to different embodiments and to the availability of improved materials (power supplies or ceramics for example) without departing from the broader inventive concepts disclosed herein and comprehended by the claims that follow.

I claim:

1. Apparatus for treatment of odor and volatile organic compound contaminants in gas emissions and for purifying gases, comprising:
    a dielectric barrier discharge non-thermal plasma (NTP) generation cell having a gas flow path therethrough, said cell having a plurality of electrically hot electrodes and ground electrodes positioned in the gas flow path so that gas flowing in the gas flow path will flow across a portion of these electrodes, at least the hot electrodes being hermetically sealed across the gas flow portion of the electrodes;

a cell gas inlet leading to the gas flow path through the cell;

a cell gas outlet for discharging gas that has passed through the cell;

a source of cleaning solution to be applied to the electrodes in the cell to wash gas stream contaminants and/or reaction by-products off the electrodes; and a plurality of nozzles in fluid flow communication with the source of cleaning solution and directed toward the electrodes to spray cleaning solution onto the electrodes at selected times during operation of the cell when desired to clean the electrodes.

2. Apparatus for treatment of odor and volatile organic compound contaminants in gas emissions and for purifying gases according to claim 1, wherein the nozzles are sized and directed to spray cleaning solution onto only a section of the electrodes to be cleaned at any particular time, and wherein the nozzles are movable so as to move in a manner to spray, over a period of time, substantially the gas flow portion of the electrodes to be cleaned.

3. Apparatus for treatment of odor and volatile organic compound contaminants in gas emissions and for purifying gases according to claim 2, wherein the nozzles take the form of a spray bar extending over the electrodes, and being mounted for movement to different positions with respect to the electrodes to spray different sections of the electrodes as the spray bar is moved to the different positions.

4. Apparatus for treatment of odor and volatile organic compound contaminants in gas emissions and for purifying gases according to claim 3, wherein the spray bar moves in forward and reverse paths along the tops of the electrodes.

5. Apparatus for treatment of odor and volatile organic compound contaminants in gas emissions and for purifying gases according to claim 3, wherein the nozzles are positioned on the spray bar and the spray bar moves so that each nozzle of the plurality of nozzles sprays sections of confronting surfaces of spaced side-by-side electrodes.

6. Apparatus for treatment of odor and volatile organic compound contaminants in gas emissions and for purifying gases according to claim 5, wherein the spray bar is mounted as part of linear motion parallel gear drive system.

7. Apparatus for treatment of odor and volatile organic compound contaminants in gas emissions and for purifying gases according to claim 6, additionally including a controller for controlling movement of and spray from the spray bar.

8. Apparatus for treatment of odor and volatile organic compound contaminants in gas emissions and for purifying gases according to claim 7, wherein the source of cleaning solution includes a cleaning solution tank and a pump.

9. Apparatus for treatment of odor and volatile organic compound contaminants in gas emissions and for purifying gases according to claim 8, wherein the controller is configured to clean the electrodes on an intermittent basis.

10. Apparatus for treatment of odor and volatile organic compound contaminants in gas emissions and for purifying gases, comprising:

a dielectric barrier discharge non-thermal plasma (NTP) generation cell having a gas flow path therethrough, said cell having a plurality of electrically hot electrodes and ground electrodes positioned in the gas flow path so that gas flowing in the gas flow path will flow across a portion of these electrodes, at least the hot electrodes being hermetically sealed across the gas flow portion of the electrodes;

a cell gas inlet leading to the gas flow path through the cell;

a cell gas outlet for discharging gas that has passed through the cell;

a source of cleaning solution to be applied to the electrodes in the cell to wash gas stream contaminants and/or reaction by-products off the electrodes, said source of cleaning solution including a cleaning solution tank and a pump;

a spray bar in fluid flow communication with the source of cleaning solution and including a plurality of nozzles directed toward the electrodes to spray cleaning solution onto the electrodes at selected times during operation of the cell when desired to clean the electrodes, said spray bar extending over the electrodes, and being mounted for movement to different positions with respect to the electrodes to spray different sections of the electrodes as the spray bar is moved to the different positions, wherein the nozzles are positioned on the spray bar and the spray bar moves so that each nozzle of the plurality of nozzles sprays sections of confronting surfaces of spaced side-by-side electrodes and wherein the spray bar is mounted as part of linear motion parallel gear drive system;

a source of catalyst solution for application to the electrodes after cleaning of the electrodes;

a controller for controlling movement of and spray from the spray bar.

11. Apparatus for treatment of odor and volatile organic compound contaminants in gas emissions and for purifying gases according to claim 10, additionally including a valve for alternatively connecting the source of cleaning solution and the source of catalyst solution to the spray bar wherein the spray bar alternatively sprays either cleaning solution or catalyst solution onto the electrodes.

12. Apparatus for treatment of odor and volatile organic compound contaminants in gas emissions and for purifying gases according to claim 11, wherein the controller is configured to control the valve to control which of the cleaning solution and the catalyst solution is sprayed from the spray bar at a particular time.

13. Apparatus for treatment of odor and volatile organic compound contaminants in gas emissions and for purifying gases according to claim 10, wherein the controller is configured to apply cleaning solution to the electrodes to clean the electrodes and, after cleaning, apply catalyst solution to the electrodes.

14. Apparatus for treatment of odor and volatile organic compound contaminants in gas emissions and for purifying gases according to claim 13, wherein the controller is configured to apply the cleaning solution and catalyst solution on an intermittent basis.

15. Apparatus for treatment of odor and volatile organic compound contaminants in gas emissions and for purifying gases, comprising:

a dielectric barrier discharge non-thermal plasma (NTP) generation cell having a gas flow path therethrough, said cell having a plurality of electrically hot electrodes and ground electrodes positioned in the gas flow path so that gas flowing in the gas flow path will flow across a portion of these electrodes, at least the hot electrodes being hermetically sealed across the gas flow portion of the electrodes;

a cell gas inlet leading to the gas flow path through the cell;

a cell gas outlet for discharging gas that has passed through the cell;

a source of cleaning solution to be applied to the electrodes in the cell to wash gas stream contaminants and/or reaction by-products off the electrodes;

a plurality of nozzles in fluid flow communication with the source of cleaning solution and directed toward the electrodes to spray cleaning solution onto the electrodes at selected times during operation of the cell when desired to clean the electrodes; and a source of catalyst solution for application to the electrodes after cleaning of the electrodes.

16. Apparatus for treatment of odor and volatile organic compound contaminants in gas emissions and for purifying gases according to claim 15, wherein the source of cleaning solution includes a cleaning solution tank and a pump.

17. Apparatus for treatment of odor and volatile organic compound contaminants in gas emissions and for purifying gases according to claim 15, additionally including a controller for controlling the spray from the nozzles, wherein the nozzles are adapted to spray either cleaning solution or catalyst solution onto the electrodes, and wherein the controller is configured to control which solution is sprayed from the nozzles at a particular time.

* * * * *